Figure 1:
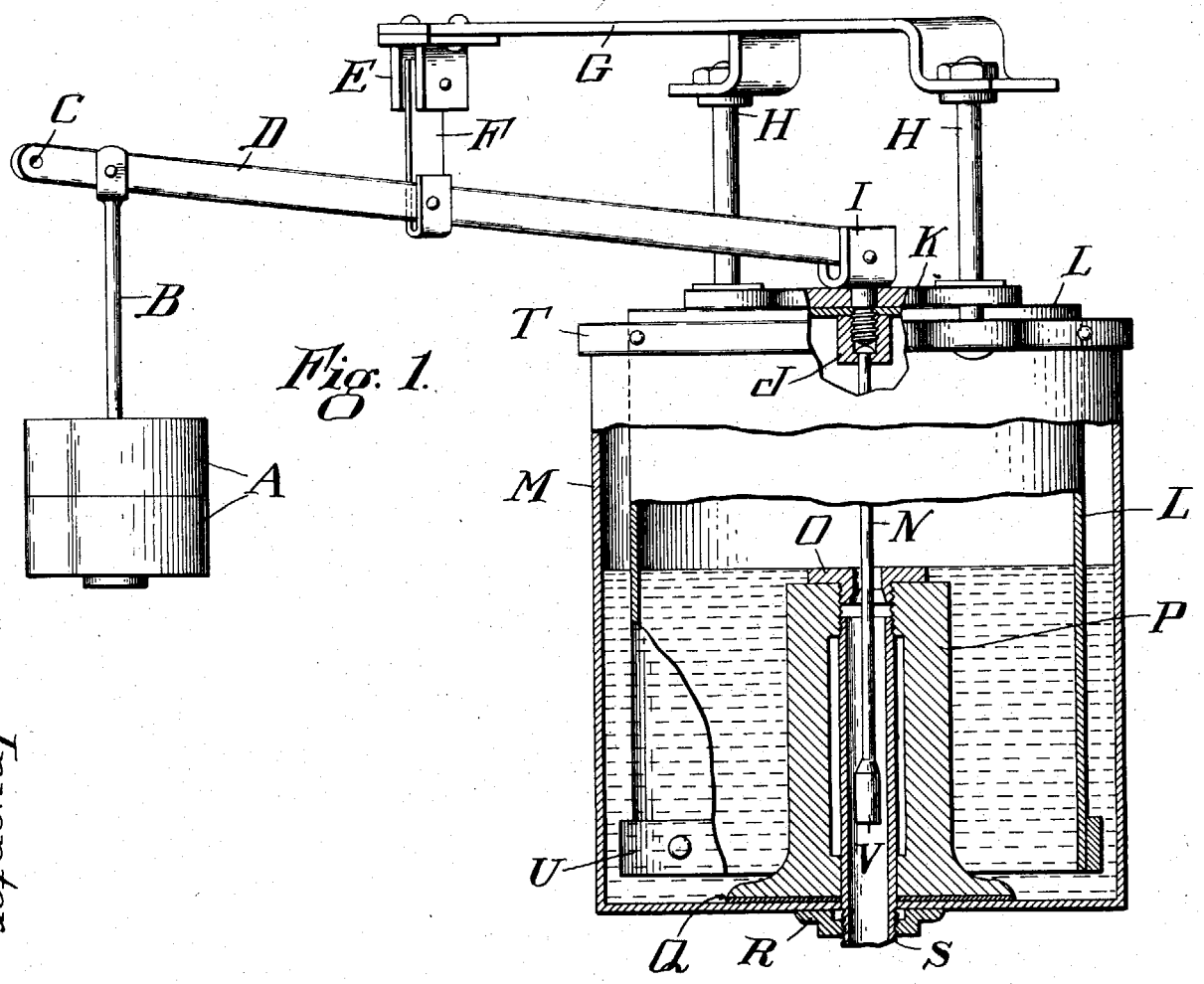

N. B. JOHNSON.

STEAM FURNACE REGULATING SYSTEM.

APPLICATION FILED JAN. 3, 1916.

Reissued Mar. 28, 1916.

14,093.

2 SHEETS—SHEET 1.

Inventor
Nelson B. Johnson.
By Attorneys.
Southgate & Southgate.

THE COLUMBIA PLANOGRAPH CO., WASHINGTON, D. C.

N. B. JOHNSON.
STEAM FURNACE REGULATING SYSTEM.
APPLICATION FILED JAN. 3, 1916.
Reissued Mar. 28, 1916.
14,093.
2 SHEETS—SHEET 2.
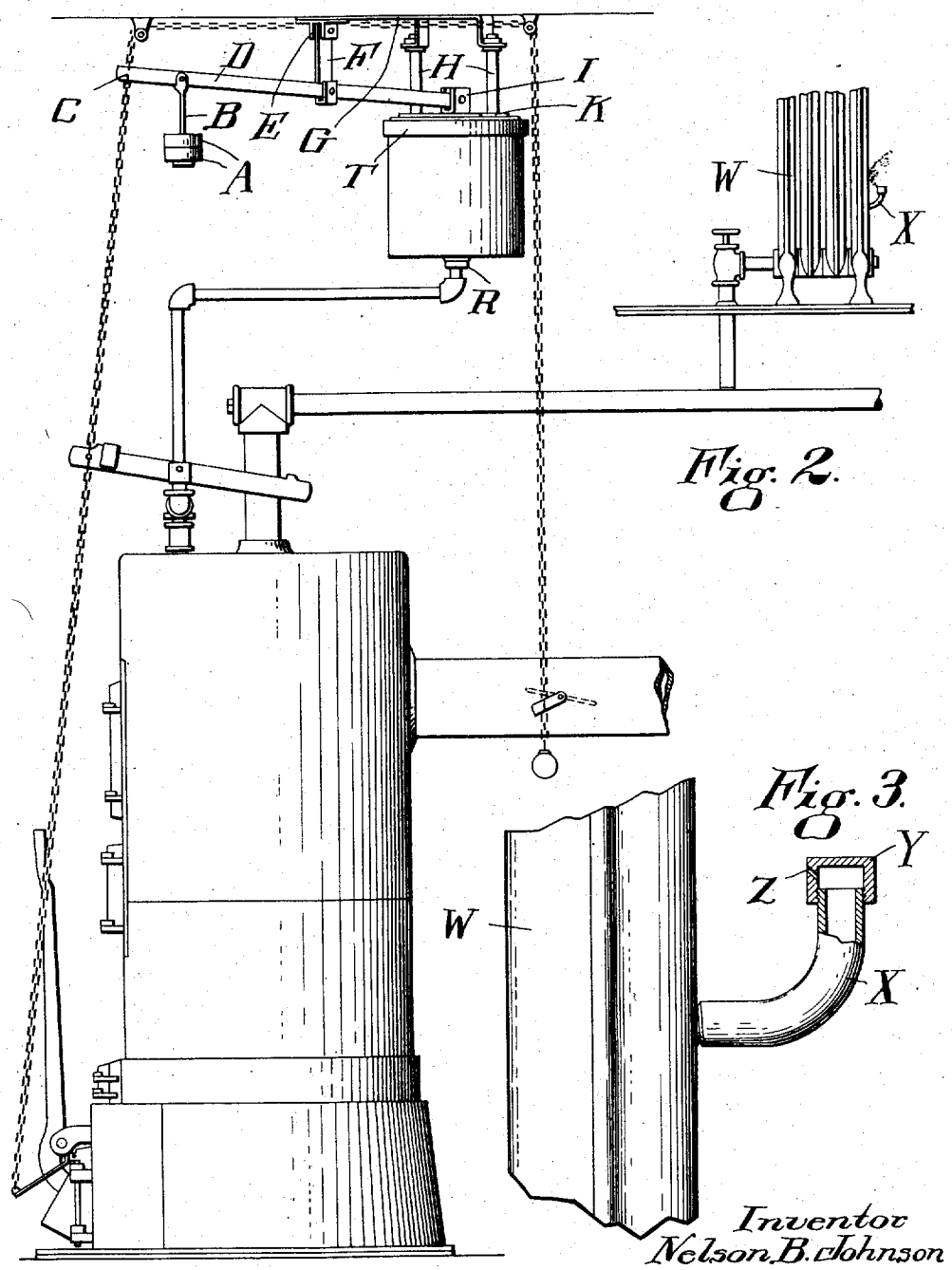
Inventor
Nelson B. Johnson
By Attorneys.
Southgate & Southgate.
THE COLUMBIA PLANOGRAPH CO., WASHINGTON, D. C

UNITED STATES PATENT OFFICE.

NELSON B. JOHNSON, OF WEBSTER, MASSACHUSETTS.

STEAM-FURNACE-REGULATING SYSTEM.

14,093. Specification of Reissued Letters Patent. Reissued Mar. 28, 1916.

Original No. 1,157,003, dated October 19, 1915, Serial No. 856,136. Application for reissue filed January 3, 1916. Serial No. 70,023.

*To all whom it may concern:*

Be it known that I, NELSON B. JOHNSON, a citizen of the United States, residing at Webster, county of Worcester, State of Massachusetts, have invented a new and useful Steam-Furnace-Regulating System, of which the following is a specification.

The object of this invention is to provide a device that with a very low steam pressure will effectively govern combustion of fuel under, and steam gerenation in, boilers used for heating purposes so that steam heating systems as below specified can be used.

My invention makes it unnecessary to use automatically closing valves for liberating air from radiating surface. In its stead an always open vent can be used. The use of open vents to liberate air from radiating surface greatly facilitates heating inasmuch as the slightest pressure of steam generated in boiler above atmospheric pressure will liberate air from radiating surface uniformly, not leaving one radiating unit cold when others are heated. In other words, uniform heating is sure to take place. When the generation of steam in boiler is sufficient to entirely fill radiation, absolute air removal in radiating surface takes place greatly increasing heating efficiency. When radiating surface is completely filled with steam, a fine jet of vapor is discharged from open vents. This acts as a humidifying system which is very beneficial to health. This fine jet or vapor can be discharged against heated radiating surface making same invisible and under a pressure of steam from one to two and one-half oz. at boiler is practically noiselessly discharged.

The advantages that heating systems having this invention to govern combustion of fuel and steam generation in boilers are as follows:—Absolute uniformity of heating. Every heating unit filled with steam if desired. Absolutely noiseless. Radiating surface can be turned on or off without interfering with circulation of steam always being under complete balance. Will not hold water from condensation back in radiating surface or piping or discharge water from air relief vents. If sufficient quantity of fuel is maintained and fire kept clean under boiler, uniform pressure is maintained of from a fraction of one oz. to one and one-half oz. maximum steam pressure. When one and one-half oz. pressure has been reached, if this device has been balanced to making this one and one-half oz. maximum pressure, a complete working of a combination of dampers has taken place effectively, closing a damper governing air to the fire and another damper governing the products of combustion from the fire. This in turn governs steam generating temperature in boiler. Complete checking of combustion under boiler does not take place unless entire radiating surface open to entrance of steam is completely filled and heated.

This device will work a combination of dampers allowing enough combustion of fuel and steam generating temperature in boiler to offset condensation of steam in radiating surface; steam pressure never exceeding more than what device is balanced to maintain which has been found to be from one oz. to two and one-half oz. steam pressure, the latter being sufficient to heat any building suitable for gravity return of water from condensation to boiler.

Having thus described the object and advantages of this invention, I will refer to the accompanying drawing, in which—

Figure 1 is a vertical sectional drawing showing this steam controlling device; Fig. 2 is a side view of the device and the furnace to which it is attached, showing also a part of a radiator connected therewith, and Fig. 3 is a side view of one of the parts of the radiator with the open vent shown partly in section.

The main portion of this device is made up of two receptacles, letter M representing the outer receptacle and letter L the open bottom inner receptacle.

Letter S represents the steam connection and supply from boiler to device.

Letter P represents casing for steam supply pipe S.

Letter V represents steam check.

Letter O represents seats for steam check V.

It will be noted that inner receptacle L is spaced from outside receptacle M. It will be also noted that this space is occupied by a water-seal or other suitable liquid. It will also be noted that this water-seal or other liquid extends up inside of inner receptacle L to a level of the height of steam supply pipe S, this being its overflow point as will be seen. When steam enters pipe S from boiler and enters inner receptacle L above water seal, a pressure of steam in inside receptacle L above water seal takes place as before stated of from 1 oz. to 2½ oz. or whatever pressure this device is balanced to maintain to work a complete combination of dampers as before explained. As pressure increases in inside receptacle L liquid seal is forced downward. This in turn raises liquid seal in outer receptacle M in space between inner and outer receptacle, this causing a resistance which causes inner receptacle to rise and thereby working regulating lever D which in turn works the different chain connections that are attached to damper rod D at point marked C, device being balanced to maintain certain pressures by weights A. These weights resting on carrier B, inner receptacle as pressure increases continues to rise and is guided in its ascent by casting K and guides H. Damper rod D is fastened to guide casting K which is riveted to top of inside receptacle L and also held by hinge I for damper rod D passing through same and fastened with nut J as will be seen by referring to drawing.

Damper rod D is pivoted to flexible link F. This in turn is pivoted to clip E of hanger G as will be seen. When maximum pressure in inner receptacle L has taken place and inner receptacle has reached its maximum height on guides H, steam check V is lifted up into seat O thereby nearly closing off steam supply just allowing steam enough to enter inside receptacle L to allow for condensation taking place. This prevents steam pressure from blowing out liquid seal, should draft doors or any other portion of steam generating device that governs the combustion of fuel be left open that this device cannot control.

It will be noted that no condensation of steam can take place that enters pipe S as inside of casing P is spaced from pipe S as will be seen. This forms a dead air space and no conduction can take place. It will be noted that casing P is made tight to bottom of outside receptacle M with packing between the two parts shown by letter Q. This casing is held tight by lock-nut R which is screwed onto steam supply pipe S and against bottom of outside receptacle M holding casing P and its different connections rigidly in place as will be seen. Steam check V is flexibly connected with rod N. Rod N in turn is flexibly connected with nut J as will be seen. This allows for a little variation should casing P and seat O be not quite plumb so that no binding can take place.

In fastening up this device hanger G is made fast to some portion of timbers or otherwise above boiler. Then guides H are inserted into hanger G that has been made fast as before stated and lock-nuts that are shown screwed up. This securely holds device. Guides H are screwed into bosses cast on top casting T which is riveted to outer receptacle M as will be noted.

Inside receptacle L is guided at bottom with a cast band U. This make-up as described allows for smooth and frictionless working of inner receptacle L and as the pressure or lifting force is uniformly distributed on top of inner receptacle L no friction can take place.

One special object of the working of this controller is that inside receptacle L will ascend nearly its entire distance on guides H with but very slight increase in pressure, thereby very effectively working any desired combination of dampers that will completely check combustion of fuel and steam generation without having to balance these dampers so fine that the slightest collection of soot or other substances would render same inoperative. In other words, this device with slight pressure as aforesaid can be made powerful enough to lift considerable weight which is an important object of the invention, also being such as to require practically no attention.

Another feature of this device is,—should controlling device be checking steam generation either wholly or partly and should steam generation in boiler not be sufficient to keep up a supply of steam in inside working receptacle L a vacuum will take place in inside receptacle L in steam space of same above water seal. This will cause considerable agitation of liquid seal, atmospheric pressure causing liquid seal to be forced downward in outside receptacle and forcing same to nearly fill inside receptacle. The reason that a vacuum can be formed in inside receptacle L when steam supply is not sufficient to keep inside receptacle L filled with steam without a vacuum being formed in steam boiler is that the condensing of steam in inside receptacle L takes place almost instantaneously causing water or liquid seal to immediately be forced upward by atmospheric pressure, this causing some water to be discharged into steam supply pipe S and as there is now a vacuum inside receptacle L this holding water discharged into supply pipe S in the form of a plug in same, thereby not admitting any air or vapor to enter from steam boiler. This vacuum, however, does not hold long as liquid seal is forced to fill inside receptacle L, this lowering water or liquid seal below bottom of inside receptacle L. When this takes place, air is admitted bubbling through water inside of receptacle L which fills the vacuum and water or liquid seal falls back again to its natural position enough water or liquid seal is always left to properly seal device. As this vacuum is formed as aforesaid, a force is exerted on the top surface of inside receptacle L according to the number of square inches exposed in the top surface and the number of inches of depth of water or liquid seal. This adds a downward force many times greater than the weight of inside receptacle L causing dampers to be opened immediately. It is obvious that this feature is very important as not the weight only of receptacle L is depended upon to open dampers.

After this device has been installed and filled with water, if this is used for sealing same, no further attention is required as the condensation of steam will keep this device filled to a point shown by the dotted lines in drawing, as all these advantages that are herein specified have been observed from practical observation of this device in actual use.

The radiator W is shown as provided with an open vent device in the form of a tube X extending from one of the radiator sections and having at its end a cap Y provided with an inclined vent opening Z. This vent opening is always open and is inclined toward the heated radiating surface of the adjacent radiator section W so as to discharge a fine jet of steam against that surface. This makes the jet invisible and, under a pressure of from one to two and one-half ounces at the boiler, the discharge is practically noiseless. By the use of this open vent the lightest pressure of steam generated in the boiler above atmospheric pressure will liberate the air from the radiating surfaces uniformly. In this way one radiating unit cannot be left cold when others are heated and uniform heating throughout the system is necessary.

When the generation of steam in the boiler is sufficient to entirely fill the open radiators the air is absolutely removed from all the radiating surfaces by this device, thus greatly increasing the heating efficiency. Under these conditions a fine jet of vapor is discharged from the open vent and in addition to the advantages just mentioned it acts as a humidifying system introducing moisture into the otherwise dry air which is very beneficial to the health. Furthermore, it makes a room comfortable at a lower temperature than would be the case with perfectly dry heat.

Although I have illustrated and described only a single embodiment of the invention, I am aware of the fact that many modifications can be made therein by any person skilled in the art without departing from the scope of the invention as expressed in the claims. Therefore, I do not wish to be limited to all the details of construction herein shown, but What I do claim is:—

1. In a device for regulating a steam heating furnace, the combination of a receptacle, a receptacle vertically movable with respect thereto, said receptacles having a liquid seal therebetween, means for introducing steam from the steam space of the boiler of the furnace to be regulated into contact with the movable receptacle over said liquid seal, a port through which the steam enters, said port having a valve seat, and a valve for said port, flexibly connected with said movable receptacle to be operated thereby.

2. In a device for regulating a steam heating furnace, the combination of a receptacle, an open bottom receptacle vertically movable therein, said receptacles having a liquid seal therein, means for introducing steam from the steam space of the boiler of the furnace to be regulated into contact with the inner receptacle, means connected with said inner receptacle for operating the dampers of the furnace as the inner receptacle moves, and means for stopping the entrance of steam into the inner receptacle when the inner receptacle moves to a predetermined position.

3. In a device for regulating a steam heating furnace, the combination of a receptacle, an open bottom receptacle vertically movable therein, said receptacles having a liquid seal therein, means for introducing steam from the steam space of the boiler of the furnace to be regulated into interior of the inner receptacle, means connected with said inner receptacle for operating the dampers of the furnace as the inner receptacle moves, and a valve movable with the inner receptacle for reducing the entrance of steam into the inner receptacle when the inner receptacle moves to a predetermined height.

4. In a device for regulating a steam heating furnace, the combination of a receptacle, an open bottom receptacle vertically movable therein, said receptacles having a liquid seal therein, means for introducing steam from the steam space of the boiler of the furnace to be regulated into contact with the inner receptacle, a port through which the steam enters, said port having a valve seat, and a valve for nearly closing said port movable with the inner receptacle.

5. In a device for regulating a steam heating furnace, the combination of a receptacle, an open bottom receptacle vertically movable therein, said receptacles having a liquid seal therein, means for introducing steam from the steam space of the boiler of the furnace to be regulated into the interior of the inner receptacle, a port through which the steam enters said inner receptacle, said port having a valve seat, and a valve for said port, flexibly connected with the top of said inner receptacle.

6. In a device for regulating a steam heating furnace, the combination of an open top receptacle, an open bottom receptacle vertically movable therein, said receptacles having a liquid seal therein, a steam pipe from the boiler of the furnace to be regulated entering the bottom of the outer receptacle and extending up therein, and constituting the overflow for the liquid seal, and a casing surrounding said pipe and spaced therefrom to furnish a dead air space, to prevent excessive condensation in the steam pipe.

7. In a device for regulating a steam heating furnace, the combination of an open top receptacle, an open bottom receptacle vertically movable therein, said receptacles having a liquid seal therein, means for introducing steam from the boiler of the furnace to be regulated into the interior of the inner receptacle, a hanger above the receptacles having vertical guides for said inner receptacle, and stops on said guides for supporting the inner receptacle in its lowermost position.

8. In a device for regulating a steam heating furnace, the combination of an open top receptacle, an open bottom receptacle vertically movable therein, said receptacles having a liquid seal therein, means for introducing steam from the boiler of the furnace to be regulated into the interior of the inner receptacle, a hanger above the receptacles having vertical guides for said inner receptacle, and a lever for connecting said inner receptacle with the dampers of the furnace to be regulated, said lever being supported by said hanger.

9. In a device for regulating a steam heating furnace, the combination of an open top receptacle, an open bottom receptacle vertically movable therein, said receptacles having a liquid seal therein, means for introducing steam from the boiler of the furnace to be regulated into the interior of the inner receptacle, a port through which the steam enters the inner receptacle, and a valve for closing said port when the inner receptacle rises, said valve being connected with the inner receptacle and movable therewith, and being removable upwardly through said port.

10. In a device for regulating a steam heating furnace, the combination of two receptacles, one within the other and one vertically movable, said receptacles having a liquid seal between them, means for introducing steam from the steam space of the boiler of the furnace to be regulated into contact with the movable receptacle, whereby it will act on a surface of said movable receptacle to tend to move it, means controlled by said movable receptacle for controlling the entrance of steam into contact with said movable receptacle, and means connected with said movable receptacle for operating the dampers of the furnace.

11. In a device for regulating a steam heating furnace the combination of two receptacles telescoping one into the other, and having a liquid seal between them, one having an open lower end and a closed top and adapted to float, there being an air or steam space therein above the liquid seal, means for introducing steam from the steam space of the boiler of the furnace to be regulated into a closed space higher than said liquid seal and into contact with said floating receptacle to cause it to move relatively to the other receptacle, means operated by said floating receptacle for controlling the entrance of steam into contact with said floating receptacle, and means connected with said floating receptacle for operating the dampers of the furnace.

In testimony whereof I have hereunto set my hand.

NELSON B. JOHNSON.

Copies of this patent may be obtained for five cents each, by addressing the "Commissioner of Patents, Washington, D. C."